United States Patent [19]

Ryoke et al.

[11] Patent Number: 5,407,725
[45] Date of Patent: Apr. 18, 1995

[54] MAGNETIC RECORDING MEDIUM HAVING A MAGNETIC LAYER CONTAINING TWO CARBON BLACKS EACH WITHIN SPECIFIC PARTICLE SIZE AND DBP ADSORBSTON RANGES

[75] Inventors: Katsumi Ryoke; Yutaka Kakuishi; Toshiyuki Kitahara; Tetsuji Nishida, all of Kanagawa, Japan

[73] Assignee: Fuji Photo Film Co., Ltd., Kanagawa, Japan

[21] Appl. No.: 184,347

[22] Filed: Jan. 21, 1994

Related U.S. Application Data

[63] Continuation of Ser. No. 937,124, Aug. 31, 1992, abandoned.

[30] Foreign Application Priority Data

Sep. 6, 1991 [JP] Japan .................................. 3-254153

[51] Int. Cl.⁶ .................................................. G11B 5/00
[52] U.S. Cl. ........................................ 428/141; 428/323; 428/402; 428/408; 428/694 BN; 428/694 BB; 428/694 BR; 428/900
[58] Field of Search ............... 428/323, 402, 408, 694, 428/695, 900, 694 BN, 694 BB, 694 BR, 141; 427/128; 252/62.54

[56] References Cited

U.S. PATENT DOCUMENTS

| | | | |
|---|---|---|---|
| 4,654,258 | 3/1987 | Kawamata et al. | 428/323 |
| 4,774,147 | 9/1988 | Kuse et al. | 428/323 |
| 4,812,358 | 3/1989 | Miyake et al. | 428/323 |
| 4,818,606 | 4/1989 | Koyama et al. | 428/323 |
| 4,988,562 | 1/1991 | Ryoke et al. | 428/323 |

*Primary Examiner*—Stevan A. Resan
*Attorney, Agent, or Firm*—Sughrue, Mion, Zinn, Macpeack & Seas

[57] ABSTRACT

A magnetic recording medium comprising a non-magnetic support having thereon a magnetic layer comprising a ferromagnetic powder and a binder resin is disclosed. The magnetic layer contains a first carbon black having a DBP absorption of from 40 to 120 ml/100 g and a second carbon black having a DBP absorption of from 140 to 200 ml/100 g. Both carbon black have an average particle size of from 5 to 35 m$\mu$. The medium maintains a high output level and has excellent running stability. Therefore, the dropout due to abrasion caused by an increase in friction coefficient and output reduction due to head clogging, can be avoided.

4 Claims, No Drawings

MAGNETIC RECORDING MEDIUM HAVING A MAGNETIC LAYER CONTAINING TWO CARBON BLACKS EACH WITHIN SPECIFIC PARTICLE SIZE AND DBP ADSORBSTON RANGES

This is a continuation of application Ser. No. 07/937,124 filed Aug. 31, 1992, now abandoned.

FIELD OF THE INVENTION

This invention relates to a magnetic recording medium having improved output and comprising a non-magnetic support and a magnetic layer provided thereon. More particularly, it relates to a magnetic recording medium which exhibits high output in a VTR, improved contact with the head, and excellent running stability.

BACKGROUND OF THE INVENTION

Magnetic recording media, such as audio tapes, video tapes, and computer discs and memory tapes, generally comprise a non-magnetic support having thereon a magnetic layer containing a ferromagnetic powder dispersed in a binder.

Magnetic recording media recently developed to meet the demand for high-density recording, such as Hi-8 video tapes, have achieved a high S/N ratio or noise reduction through manipulations such as size reduction of ferromagnetic powders, use of metal powders, increase in packing density, and smoothing of the surface of the magnetic layer.

Further, high definition VTR systems, such as "UNIHI", are required to be capable of rapid signal processing through increase in writing and reading speeds. For example, the head cylinder speed in a helical scanning system has reached 5400 RPM or higher. A magnetic recording medium which undergoes such high-speed sliding must have sufficient stability against damage from being run on a VTR. For this purpose, carbon black or other fillers having a Mohs' hardness of 8 or higher, called abrasives, have been used as disclosed in JP-A-59-193533, JP-A-59-186125, JP-A-59-191133, JP-A-59-189831, JP-A-59-63029, JP-A-63-168821, JP-A-63-168822, and JP-A-1-185821 (the term "JP-A" as used herein means an "unexamined published Japanese patent application").

It is desirable for achievement of high-density recording that the amount of fillers as well as that of binders be minimized so as to increase as much as possible the packing density of a ferromagnetic powder in the magnetic layer. The problem associated with the above-described recently developed magnetic recording media is that high packing is not achieved without a sacrifice in running stability, especially in resistance to damage.

On the other hand, while improvement in the smoothness of magnetic layers is needed to increase the output of magnetic recording media, a magnetic layer with a mirror surface tends to have poor running stability. That is, the coefficient of friction on running increases with an increase in surface smoothness, causing adhesion of the tape in the VTR. In this connection, the magnetic layer should contain fillers, especially carbon black in a large amount, to control smoothness. For example, JP-A-185821 suggests the use of coarse carbon black particles having an average diameter of at least 150 mμ to ensure running properties. However, use of such coarse particles unavoidably results in considerable reduction in packing and surface properties. While incorporation of coarse carbon black particles into a magnetic layer, even in a small proportion, is effective in maintaining running stability, there is a great spacing loss between the tape and the VTR head due to protrusion of the coarse carbon black particles in the magnetic layer. This leads to a noticeable decrease in output.

Further, coarse carbon black particles of 50 mμ or greater, added in an amount of from 3 to 20 parts by weight per 100 parts by weight of a ferromagnetic powder, are less effective in decreasing surface electrical resistance of the magnetic layer than the same amount of finer particles. Accordingly, the coarse carbon black particles should be used in a larger amount than fine particles. This means a decrease in packing density of the ferromagnetic powder, leading to a decrease in output of the magnetic recording medium. Where coarse carbon black is used in an amount of from 0.5 to 3 parts by weight per 100 parts by weight of a ferromagnetic powder only for the purpose of maintaining running stability, improvement in running stability, particularly a reduction in the coefficient of friction, will result. But protrusions of the coarse particles appearing on the surface of the magnetic layer make a spacing loss, causing output reduction or variation.

When fine carbon black particles having a particle size of from 5 to 35 mμ in a magnetic layer are used, the surface electrical resistance of the magnetic layer can be reduced more efficiently than when coarse carbon black particles are used. Thus, an addition amount of fine particles of from 0.1 to 5 parts by weight per 100 parts by weight of a ferromagnetic powder is sufficient. Within this addition range, the decrease in packing density is controllable. Addition amounts higher than 5 parts result in reduced packing density. However, even if the above fine carbon black particles are used in the above amount, it is still extremely difficult to maintain running stability. Specifically, the magnetic layer surface suffers from cracks due to an increase in frictional coefficient, causing an increase in dropout or a decrease in output due to clogging of the head.

JP-A-63-168821 describes oil (dibutyl phthalate, hereinafter "DBP") absorption of carbon black. According to the disclosure, carbon black particles having a DBP absorption exceeding 150 ml/100 g cause a reduction of S/N ratio while those having a DBP absorption of not more than 110 ml/100 g cause a reduction in output. That is, carbon black particles having too high or too low DBP absorption do not necessarily improve the electromagnetic characteristics of magnetic recording media.

Thus, even with the above-described techniques developed to date, it has been very difficult to satisfy both the requirements of high output and excellent running stability, because maintenance of running stability requires surface roughening of a magnetic layer, and efficient surface roughening inevitably requires use of coarse carbon black particles.

SUMMARY OF THE INVENTION

One object of the present invention is to provide a magnetic recording medium which maintains a high level of output and excellent running stability. Thus, dropout caused by abrasion and scratching of tapes due to an increase in friction coefficient and output reduction due to head clogging generated by scratched powders can be avoided.

These and other objects of the invention are accomplished by a magnetic recording medium comprising a non-magnetic support having thereon a magnetic layer comprising a ferromagnetic powder and a binder resin, wherein the magnetic layer also contains at least two kinds of carbon black each having separate oil absorptions, the first carbon black (hereinafter "C1") having an average particle size of from 5 to 35 m$\mu$ and a DBP absorption of from 40 to 120 ml/100 g, and the second carbon black (hereinafter "C2") having an average particle size of from 5 to 35 m$\mu$ and a DBP absorption of from 140 to 200 ml/100 g.

In one preferred embodiment of the present invention, the total carbon black content of the magnetic layer is from 0.5 to 5 parts by weight per 100 parts by weight of the ferromagnetic powder, with the C1 to C2 weight ratio being from 95/5 to 40/60.

In another preferred embodiment of the present invention, the magnetic layer has a centerline average surface roughness Ra ((cut-off value: 0.08 mm) according to JIS B 0601) of not more than 5.0 nm, and the ferromagnetic powder is a ferromagnetic metal powder.

In order to eliminate the disadvantages associated with the conventional carbon black particles which are different in size, the inventors have studied the use of fine carbon black particles of approximately the same size. As a result, they have succeeded in obtaining noticeable effects on output and running stability. The problems arising from the use of coarse black carbon particles, i.e., protrusions of particles through a magnetic layer and reduction in packing density, can be solved by controlling the average particle size of carbon black to between 5 to 35 m$\mu$. Further, running stability can be maintained by using at least two kinds of carbon black (C1, C2) differing in DBP absorption to facilitate the smooth supply of lubricants to the surface of the tape. Additionally, the carbon black having a higher DBP absorption (C2) accelerates adsorption of binders to form moderate micro-agglomerates, by which the surface properties of the magnetic layer can be maintained. The requirements of output and running stability can thus be achieved simultaneously.

It has not yet been clarified in detail why the fine carbon black particles having different DBP absorptions satisfy both output and running stability. It is believed that the surface physical property of carbon black, particularly interaction between the carbon black and the lubricants or resins present in the magnetic layer, is varied among particles of different DBP absorption, and thereby the magnetic layer as a whole exhibits the above-described characteristics.

DETAILED DESCRIPTION OF THE INVENTION

The average particle size of carbon black can be determined from the primary particle size (the size of a non-agglomerated particle) observed under an electron microscope. For the details, reference can be made to *Carbon Black BINRAN*, 3rd Ed., p. 174 (1973). The DBP (dibutyl phthalate) absorption of carbon black can be determined according to JIS K6621-1970 or ASTM D 2414-65T.

In the present invention, sufficient packing density and a sufficient surface electrical resistance can be obtained by using fine particles of carbon black having an average particle size of from 5 to 35 m$\mu$ in the magnetic layer. As a result, high output can be maintained while suppressing static electrification which causes adhesion of the tape or adsorption of dust leading to dropout. Since at least two different kinds of carbon black, the first carbon black having a DBP absorption of from 40 to 120 ml/100 g and the second carbon black having a DBP absorption of from 140 to 200 ml/100 g, are used in the magnetic layer, lubricants in the magnetic layer can be supplied smoothly to the surface, thereby ensuring running stability. Adsorption of binders onto carbon black can be accelerated by the use of the carbon black having a higher DBP absorption to form moderate micro-agglomerates. The micro-agglomerates maintain surface properties. Output and running stability can thus be satisfied simultaneously. In addition, since the carbon black having a lower DBP absorption exhibits satisfactory dispersibility, the ferromagnetic powder can be packed uniformly and densely.

Thus, the use of a plurality of kinds of carbon black which are different in DBP absorption but have approximately the same size brings about high packing density, high output, and excellent running stability. These features are not possible with conventional magnetic recording media. Additionally, the coating film strength can be increased to obtain improved toughness.

Of the two or more different kinds of carbon black of the present invention, the first carbon black (C1) has a DBP absorption of from 40 to 120 ml/100 g, and preferably from 50 to 100 ml/100 g; and the second carbon black (C2) has a DBP absorption of from 140 to 200 ml/100 g, and preferably from 150 to 190 ml/100 g.

If the DBP absorption of C1 is less than 40 ml/100 g, the structure of the particle fails to develop sufficiently to reduce effectively the surface electrical resistance of the magnetic layer. If the DBP absorption of C2 is more than 200 ml/100 g, the agglomerates become very large to cause a reduction in surface properties. When the DBP absorption is between 120 and 140 ml/100 g, the coefficient of friction increases to cause running disturbances.

The weight ratio of C1 to C2 ranges from 95/5 to 40/60, preferably from 90/10 to 50/50, and more preferably 80/20 to 60/40. If the C1 ratio is too high, the carbon black agglomerates decrease in number and, as a result, the coefficient of friction increases to reduce the running durability. If the C2 ratio is too high, the agglomerates of carbon black become large to excessively increase the surface roughness of the magnetic layer.

The two kinds of carbon black of the present invention, C1 and C2, are not particularly limited, provided that the above-described requirements of DBP absorption and average particle size are fulfilled. Carbon black kinds of various compositions or structures may be used either singly or in combination.

It is preferable to control the surface roughness of the magnetic layer so that the centerline average surface roughness Ra ((cut-off value: 0.08 mm) according to JIS B 0601) is not more than 5.0 nm, and particularly not more than 4.5 nm. Further, the effects of the present invention can be enhanced by choosing a ferromagnetic metal powder as the ferromagnetic powder.

The magnetic recording medium according to the present invention basically comprises a non-magnetic support having thereon a magnetic layer containing at least a ferromagnetic powder, a binder resin, and carbon black (C1, C2). If desired, the magnetic recording medium may further include another magnetic layer or a backing layer containing non-magnetic powders (e.g., carbon black, inorganic powders, abrasives, solid lubricants) and a binder resin on the non-magnetic support on the side opposite to the above-described magnetic layer.

If desired, the magnetic layer may further contain lubricants, abrasives, anti-corrosive agents, antifungal agents, antistatic agents, non-magnetic powders, dyes, organic magnetic compounds, dispersants, and the like. The magnetic layer may have a multi-layer structure composed of two or more layers containing the same or different ferromagnetic powder. An adhesive layer, an undercoating layer, or an intermediate layer containing a non-magnetic powder (e.g., carbon black, inorganic powders, abrasives, solid lubricants) and a binder resin may be provided between the non-magnetic support and the magnetic layer or between the non-magnetic support and the backing layer.

The carbon black which can be used in the magnetic layer includes furnace black for rubbers, thermal black for rubbers, carbon black for coloring, acetylene black, and lamp black. These carbon blacks are known in the United States under, for example, the following abbreviations: SAF, ISAF, IISAF, T, HAF, SPF, FF, FEF, HMF, GPF, APF, SRF, MPF, ECF, SCF, CF, FT, MT, HCC, HCF, MCF, LFF and RCF. Specifically, carbon blacks which fall under ASTM D-1765-82a may be used.

The carbon black in the magnetic layer has an average particle size of from 5 to 35 m$\mu$ as measured under an electron microscope, a specific surface area of from 10 to 400 m$^2$/g as measured by a nitrogen gas adsorption method, a pH of from 2 to 11 as measured according to JIS K-6221-1982, and a DBP (dibutyl phthalate) adsorption of from 40 to 120 ml/100 g or from 140 to 200 ml/100 g as measured according to JIS K-6221-1982. Carbon black which has been surface-treated with a dispersant, etc., resin-grafted carbon black, or carbon black having its surface partly graphitized by increasing the furnace temperature to 2000° C. or higher, may be employed. A special kind of carbon black having a hollow structure may also be used.

The carbon black is used in the magnetic layer in a total amount of from 0.5 to 5 parts by weight, and preferably from 1 to 3 parts by weight, per 100 parts by weight of the ferromagnetic powder. In addition, carbon black other than ones specified above as C1 and C2 may also be used in a total amount of less than 0.4 part by weight per 100 parts by weight of the ferromagnetic powder of the magnetic layer for other purposes than those described above.

In choosing carbon black for use in the magnetic layer, Carbon Black Kyokai (ed.), *Carbon Black Binran* (1971) can be referred to. Examples of suitable carbon black are described, e.g., in U.S. Pat. Nos. 4,539,257 and 4,614,685, JP-A-61-92424, and JP-A-61-99927. Specific examples of commercially available carbon black having a DBP absorption of from 40 to 120 ml/100 g and an average particle size of from 5 to 35 m$\mu$ include MITSUBISHI #650B (size: 18 m$\mu$; DBP absorption: 120 ml/100 g), MITSUBISHI #950B (size: 16 m$\mu$; DBP absorption: 74 ml/100 g), MITSUBISHI 40B (size: 20 m$\mu$; DBP absorption: 115 ml/100 g, MITSUBISHI 44B (size: 20 m$\mu$; DBP absorption: 80 ml/100 g), MITSUBISHI 3150B (size: 25 m$\mu$; DBP absorption: 110 ml/100 g) (all produced by Mitsubishi Chemical Corporation); RAVEN 2000B (size: 20 m$\mu$; DBP absorption: 65 ml/100 g), CONDUCTEX (size: 20 m$\mu$; DBP absorption: 115 ml/100 g), and CONDUCTEX SC (size: 20 m$\mu$; DBP absorption: 115 ml/100 g) (all produced by Columbia Carbon Co., Ltd.).

Specific examples of commercially available carbon black having a DBP absorption of from 140 to 200 ml/100 g and an average particle size of from 5 to 35 m$\mu$ include MITSUBISHI #3250B (size: 30 m$\mu$; DBP absorption: 160 ml/100 g) (produced by Mitsubishi Chemical Corporation); and VULCAN XC-72 (size: 20 m$\mu$; DBP absorption: 178 ml/100 g) and BP 905 (size: 20 m$\mu$; DBP absorption: 140 ml/100 g) (all produced by Cabot Corp.).

Ferromagnetic powders which can be used in the present invention include $\gamma$-Fe$_2$O$_3$, Co-containing (i.e., Co-coated, Co-modified, or Co-doped) $\gamma$-Fe$_2$O$_3$, Fe$_3$O$_4$, Co-containing (i.e., Co-coated, Co-modified, or Co-doped) Fe$_3$O$_4$, $\gamma$-FeO$_x$ (x=1.33 to 1.5), Co-containing (i.e., Co-coated, Co-modified, or Co-doped) $\gamma$-FeO$_x$ (x=1.33 to 1.5), and CrO$_2$. In particular, ferromagnetic metal powders, such as an Fe, an Fe—Co alloy, an Fe—Co—Ni alloy, an Fe—Co—Ni—P alloy, an Fe—Co—Ni—B alloy, an Fe—Ni—Zn alloy, an Ni—Co alloy, and a Co—Ni—Fe alloy, are preferred. The ferromagnetic metal powders usually have a particle size of from about 0.005 to 1 $\mu$m with an acicular ratio (long axis/short axis ratio) of from about $\frac{1}{2}$ to 15/1; a specific surface area of from 35 to 80 m$^2$/g, preferably from 48 to 70 m$^2$/g; a coercive force (Hc) of from 1250 to 2,500 Oe; a water content of from 0.1 to 2.0% by weight; and a pH of from 3 to 11 (in a solution of 5 g-ferromagnetic metal powder/100 g-water). Before being dispersed in a binder, the ferromagnetic powder may be impregnated and adsorbed with a solution of an appropriate additive, such as an anti-corrosive agent, a surface treating agent, a dispersant, a lubricant, an antistatic agent, and so on.

The magnetic recording medium of the present invention comprises a non-magnetic support having thereon a magnetic layer containing the above-described ferromagnetic powder dispersed in a binder resin. If desired, the magnetic layer may further contain, in an amount of 10,000 ppm or less, elements other than those described above, e.g., Sr, Pb, Mn, Cd, Al, Si, Na, Ca, K, Ti, Cu, Zn, and S, for improving magnetic characteristics or as impurities. It is especially preferred that the ferromagnetic metal powder contains an aluminum compound or a silicon compound on its surface as a sintering inhibitor or an oxidation stabilizer in an amount of from 1 to 10% by weight based on the metal component.

More specifically, the effects of the present invention are especially obtained with use of ferromagnetic metal or alloy powders comprising Fe, Co or Ni as a main component. In particular, ferromagnetic metal or alloy powders having a specific surface area of not less than 48 m$^2$/g and a coercive force of from 1,300 to 2,500 Oe, especially from 1,500 to 1,800 Oe, are preferred. Examples of such ferromagnetic metal or alloy powders include alloys, iron nitride, and iron carbide each having a metal content of 60% by weight or more, with at least 70% by weight of the metal content being composed of at least one ferromagnetic metal or alloy (e.g., Fe, Co, Ni, Fe—Co, Fe—Ni, Co—Ni, and Co—Ni—Fe), and further, with not more than 40% by weight (preferably not more than 20% by weight) based on the metal content being composed of other elements, such as Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, and P). These ferromagnetic metal powders may contain a small amount of water, hydroxide, an oxide, an alkali metal element (e.g., Na, K), or an alkaline earth metal element (e.g., Mg, Ca, Sr).

The ferromagnetic metal powders can be prepared by known processes, such as (a) a method comprising reducing a complex organic acid salt (mainly an oxalate) with a reducing gas, e.g., hydrogen; (b) a method comprising reducing iron oxide with a reducing gas, e.g., hydrogen, to obtain Fe or Fe—Co particles; (c) a method comprising pyrolysis of a metal carbonyl compound; (d) a method comprising adding a reducing agent to an aqueous solution of a ferromagnetic metal, e.g., sodium boronhydride, a hypophosphite, or hydrazine, to conduct reduction; (e) a method comprising electrolytically precipitating a ferromagnetic metal powder by using a mercury cathode and then removing mercury from the precipitate; and (f) a method comprising evaporating a metal in a low pressure inert gas to obtain a fine powder.

The shape of the ferromagnetic metal powder is not particularly limited, but it is usually an acicular shape, a granular shape, an ellipsoidal shape, a die shape, or a plate-like shape. The ferromagnetic metal powder preferably has a saturation magnetization ($\sigma_s$) of from 100 to 200 emu/g and a crystallite size of from 100 to 300 Å. Specific examples of these ferromagnetic metal powders are described, e.g., in JP-A-53-70397, JP-A-58-119609, JP-A-58-130435, JP-A-59-80901, JP-A-59-16903, JP-A-59-41453, JP-B-61-37761 (the term "JP-B" as used herein means an "examined Japanese patent publication"), and U.S. Pat. Nos. 4,447,264, 4,791,021, and 4,931,198.

Binders which can be used in the magnetic layer or a backing layer, if desired, include known thermoplastic resins, thermosetting resins, reactive resins, electron beam-hardening resins, ultraviolet ray-hardening resins, visible ray-hardening resins, and mixtures thereof.

Suitable thermoplastic resins have a softening point of not more than 150° C., a number average molecular weight of from 1,000 to 300,000, and a degree of polymerization of from about 50 to 2,000 (preferably from about 200 to 600).

Examples of the thermoplastic resins include vinyl chloride copolymer, vinyl chloride-vinyl acetate copolymers, vinyl chloride-vinyl acetate-vinyl alcohol copolymers, vinyl chloride-vinyl alcohol copolymers, vinyl chloride-vinylidene chloride copolymers, vinyl chloride-acrylonitrile copolymers, acrylic ester-acrylonitrile copolymers, acrylic ester-vinylidene chloride copolymers, acrylic ester-styrene copolymers, methacrylic ester-acrylonitrile copolymers, methacrylic ester-vinylidene chloride copolymers, methacrylic ester-styrene copolymers, urethane elastomers, nylon-silicone resins, nitrocellulose-polyamide resins, polyvinyl fluoride, vinylidene chloride-acrylonitrile copolymers, butadiene-acrylonitrile copolymers, polyamide resins, polyvinyl butyral, cellulose derivatives (e.g., cellulose acetate butyrate, cellulose diacetate, cellulose triacetate, cellulose propionate, nitrocellulose, ethyl cellulose, methyl cellulose, propyl cellulose, methyl ethyl cellulose, carboxymethyl cellulose, and acetyl cellulose), styrene-butadiene copolymers, polyester resins, polycarbonate resins, chlorovinyl ether-acrylic acrylic ester copolymers, amino resins, various thermoplastic synthetic rubbers, and mixtures thereof.

Specific examples of these thermoplastic resins are described, e.g., in JP-B-37-6877, JP-B-39-12528, JP-B-39-19282, JP-B-40-5349, JP-B-40-20907, JP-B-41-9463, JP-B-41-14059, JP-B-41-16985, JP-B-42-6428, JP-B-42-11621, JP-B-43-4623, JP-B-43-15206, JP-B-44-2889, JP-B-44-17947, JP-B-44-18232, JP-B-45-14020, JP-B-45-14500, JP-B-47-18573, JP-B-47-22063, JP-B-47-22064, JP-B-47-22068, JP-B-47-22069, JP-B-47-22070, JP-B-47-27886, JP-A-57-133521, JP-A-58-137133, JP-A-58-166533, JP-A-58-222433, JP-A-59-58642, and U.S. Pat. Nos. 4,571,364 and 4,752,530.

The thermosetting resins or reactive resins have a molecular weight of 200,000 or less in the state of a coating composition but increase their molecular weight greatly by addition or condensation reaction upon application of moist heat after coating and drying. Of these resins, those which do not soften or melt before thermal decomposition are preferred. Examples of suitable thermosetting or reactive resins include phenol resins, phenoxy resins, epoxy resins, polyurethane resins, polyester resins, polyurethane polycarbonate resins, urea resins, melamine resins, alkyd resins, silicone resins, acrylic reactive resins (electron beam-hardening resins), epoxy-polyamide resins, nitrocellulose melamine resins, a mixture of a high-molecular weight polyester resin and an isocyanate prepolymer, a mixture of a methacrylic acid salt copolymer and a diisocyanate prepolymer, a mixture of a polyester polyol and a polyisocyanate, urea-formaldehyde resins, a mixture of a low-molecular weight glycol, a high-molecular weight diol, and triphenylmethane triisocyanate, polyamine resins, polyimine resins and mixtures thereof. Specific examples of these resins are described, e.g., in JP-B-39-8103, JP-B-40-9779, JP-B-41-7192, JP-B-41-8016, JP-B-41-14275, JP-B-42-18179, JP-B-43-12081, JP-B-44-28023, JP-B-45-14501, JP-B-45-24902, JP-B-46-13103, JP-B-47-22065, JP-B-47-22066, JP-B-47-22067, JP-B-47-22072, JP-B-47-22073, JP-B-47-28045, JP-B-47-28048, and JP-B-47-28922.

The thermoplastic resins, thermosetting resins, or reactive resins usually contain, in addition to their main functional group, from one to six kinds of functional groups selected from: an acid radical, e.g., a carboxyl group (—COOH), a sulfinic group (—$SO_2H$), a sulfinic group (—SOH), a sulfo group (—$SO_3H$), a phosphoric group (—$OPO(OH)_2$), a phosphonic group (—$PO(OH)_2$), a sulfuric group ($OSO_3H$), or an ester group thereof or an alkali metal or alkaline earth metal salt thereof; an amphoteric group derived from, e.g., an amino acid, an aminosulfonic acid, a sulfuric or phosphoric acid ester of an amino alcohol, or an alkyl betaine; an amino group; an imino group; an imide group; an amide group; a hydroxyl group; an alkoxy group; a thiol group; an alkylthio group; a halogen atom (e.g., F, Cl, Br, I); a silyl group; a siloxane group; an epoxy group; an isocyanate group; a cyano group; a nitrile group; an oxo group; an acrylic group; and a phosphine group. The amount of each functional group in the binder resin preferably ranges from $1 \times 10^{-6}$ to $1 \times 10^{-2}$ eq. per gram.

Examples of suitable polyisocyanates which can be used in the magnetic layer and/or backing layer include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, triphenylmethane triisocyanate; a reaction product of such an isocyanate compound and a polyhydric alcohol; a polyisocyanate (dimer to decamer) obtained by condensation of the isocyanate compound; and an isocyanate-terminated reaction product of a polyisocyanate compound and polyurethane. These polyisocyanates preferably have a number average molecular weight of from 100 to 20,000. These polyisocyanate compounds are commercially available under trade names of "Coronate L", "Coronate HL", "Coronate 2030", "Coronate 2031", Millionate MR", and "Millionate MTL" (all produced by Nippon Polyurethane Co., Ltd.); "Takenate D-102", "Takenate D-110N", "Takenate D-200", "Takenate D-202", "Takenate 300S", and "Takenate 500" (all produced by Takeda Chemical Industries, Co., Ltd.); and "Sumidur T-80", "Sumidur 44S", "Sumidur PF", "Sumidur L", "Sumidur N", "Desmodur L", "Desmodur IL", "Desmodur N", "Desmodur HL", "Desmodur T65", "Desmodur 15", "Desmodur R", "Desmodur RF", "Desmodur SL", and "Desmodur Z4273" (all produced by Sumitomo Bayer, Co., Ltd.). These compounds may be used either singly or in combination of two or more thereof using difference of the hardening reaction. For the purpose of accelerating the hardening reaction, a compound having a hydroxyl group (e.g., butanediol, hexanediol, polyurethane having a molecular weight of 1000 to 10000, water), a compound having an amino group (e.g., monomethylamine, dimethylamine, trimethylamine), a metal oxide catalyst, or an iron acetyl-acetate catalyst may be used in combination. The compound having a hydroxyl group or an amino group is preferably polyfunctional. The amount of the polyisocyanate in the magnetic layer or backing layer preferably ranges from 2 to 70 parts by weight, and more preferably from 5 to 50 parts by weight, per 100 parts by weight of the sum of the binder resin and the polyisocyanate compound. The details for usage of the polyisocyanate compound are described in JP-A-60-131622 and JP-A-61-74138.

The above-described binder resins are used either singly or in combinations thereof in a total amount of from 3 to 55 parts by weight per 100 parts by weight of a ferromagnetic powder in the magnetic layer, or in a total amount of from 8 to 150 parts by weight per 100 parts by weight of a fine powder in the backing layer. If desired, additives, such as dispersants, lubricants, abrasives, antistatic agents, antioxidants, and solvents, may be added to the binder resin.

The carbon black which can be used in the backing layer includes furnace black for rubbers, thermal black for rubbers, carbon black for coloring, acetylene black, and lamp black. Carbon black added to the backing layer is used as an antistatic agent, a light screening agent, an adjuster of frictional coefficient, or an improver of durability. These carbon blacks are known in the United States under, for example, the following abbreviations: SAF, ISAF, IISAF, T, HAF, SPF, FF, FEF, HMF, GPF, APF, SRF, MPF, ECF, SCF, CF, FT, MT, HCC, HCF, MCF, LFF and RCF. Specifically, carbon blacks which fall under ASTM D-1765-82a may be used.

The carbon black to be used in the backing layer has an average particle size of from 5 to 1000 m$\mu$ as measured under an electron microscope, a specific surface area of from 1 to 800 m$^2$/g as measured by a nitrogen gas adsorption method, a pH of from 4 to 11 as measured according to JIS K-6221-1982, and a DBP absorption of from 10 to 800 ml/100 g as measured according to JIS K-6221-1982. The particle size of the carbon black to be added to the backing layer can be selected from the above-recited range according to the purpose demanded. For example, particles having an average size of from 5 to 100 m$\mu$ are used for decreasing surface electrical resistance of the backing layer; particles having an average size of from 50 to 1,000 m$\mu$ are used for controlling the strength of the backing layer; fine particles (smaller than 100 ml) are used for surface smoothing of the backing layer to give controlled surface roughness; or coarse particles (100 m$\mu$ or greater) are used for surface roughening to provide reduced frictional resistance. Carbon black having been surface-treated with a dispersant, etc., resin-grafted carbon black, or carbon black having its surface partly graphitized by increasing the furnace temperature to 2,000° C. or higher, may be employed. A special kind of carbon black having a hollow structure may also be used.

The amount of carbon black used in the backing layer preferably ranges from 20 to 400 parts by weight per 100 parts by weight of the binder resin in the layer.

In choosing carbon black for use in the backing layer, one can refer to Carbon Black Kyokai (ed.), *Carbon Black Binran* (1971). Examples of suitable carbon black are described, e.g., in U.S. Pat. Nos. 4,539,257 and 4,614,685, JP-A-61-92424, and JP-A-61-99927.

Abrasives may be used in the magnetic layer or backing layer for the purpose of improving durability of a magnetic tape or improving the VTR head cleaning effect. Materials having an abrasive effect or a scratch polishing effect and a Mohs' hardness of at least 6 are generally employed as abrasives. Such materials include $\alpha$-alumina, $\gamma$-alumina, $\alpha,\gamma$-alumina, fused alumina, silicon carbide, chromium oxide, cerium oxide, corundum, artificial diamond, $\alpha$-iron oxide, garnet, emery (mainly composed of corundum and magnetite), silica rock, silicon nitride, boron nitride, molybdenum carbide, boron carbide, tungsten carbide, titanium carbide, tripoli, diatomaceous earth, and dolomite. These abrasive materials are usually used alone or in combination of 2 to 4 kinds thereof.

Examples of commercially available abrasives which can be used in the present invention include "AKP-1", "AKP-15", "AKP-20", "AKP-30", "AKP-50", "AKP-80", "HIT-50", and "HIT-100" (all produced by Sumitomo Chemical Co., Ltd). For the details of abrasives, one can refer to JP-B-52-28642, JP-B-49-39402, JP-A-63-98828, U.S. Pat. Nos. 3,687,725, 3,007,807, 3,041,196, 3,293,066, 3,630,910, 3,833,412, 4,117,190, and 1,145,349, and West German Patent 853211.

The abrasive in the magnetic layer has an average particle size of from 0.005 to 5 $\mu$m, preferably from 0.01 to 2 $\mu$m, and more preferably from 0.1 to 0.8 $\mu$m. It is used in an amount of from 0.01 to 20 parts by weight per 100 parts by weight of the ferromagnetic powder. The total amount of carbon black and abrasive in the magnetic layer is preferably in the range of from 5 to 18 parts by weight per 100 parts by weight of the ferromagnetic powder. The abrasives in the magnetic layer preferably include those having a Mohs' hardness of 8 or more, with $\alpha$-alumina, chromium oxide, diamond, tungsten carbide, and silicon carbide being particularly preferred.

The abrasives in the backing layer have an average particle size of from 0.005 to 5 $\mu$m, and preferably from 0.01 to 2 $\mu$m. They are preferably in an amount of from 0.01 to 5 parts by weight per 100 parts by weight of the binder resin.

The powdered lubricants which can be used in the magnetic layer or backing layer include: inorganic fine powders, e.g., graphite, molybdenum disulfide, boron nitride, fluorinated graphite, calcium carbonate, barium sulfate, silicon oxide, titanium oxide, zinc oxide, tin oxide, and tungsten disulfide; and fine powders of synthetic resins, e.g., acryl-styrene resins, benzoguanamine resins, melamine resins, polyolefin resins, polyester resins, polyamide resins, polyimide resins, and polyethylene fluoride resins.

Examples of suitable organic compound lubricants include: silicone oils, such as dialkyl polysiloxane, dialkoxy polysiloxane, phenyl polysiloxane, and fluoroalkyl polysiloxane (e.g., KF-96 and KF-69 produced by Shin-Etsu Chemical Industry Co., Ltd.); fatty acid-modified silicone oils; fluorinated alcohols; polyolefins, e.g., polyethylene wax and polypropylene; polyglycols, e.g., ethylene glycol, polyethylene oxide wax; fluorine- or silicon-containing compounds, e.g., tetrafluoroethylene oxide wax, polytetrafluoroglycol, perfluoroalkyl ether, perfluoro-fatty acids, perfluoro-fatty acid esters, perfluoroalkylsulfates, perfluoroalkyl sulfonates, perfluoroalkylbenzenesulfonates, and perfluoroalkylphosphates; organic acids or esters thereof, e.g., alkylsulfates, alkylsulfonates, alkylphosphonic triesters, alkylphosphonic monoesters, alkylphosphonic diesters, alkylphosphates, and succinic esters; nitrogen- or sulfur-containing heterocyclic compounds, e.g., triazaindolizine, tetraazaindene, benzotriazole, benzotriazine, benzodiazole, and EDTA; fatty acid esters composed of a monobasic fatty acid having from 10 to 40 carbon atoms and a monohydric alcohol having from 2 to 40 carbon atoms or at least one of di-, tri-, tetra- and hexahydric alcohols having from 2 to 40 carbon atoms; fatty acid esters composed of a monobasic fatty acid having 10 or more carbon atoms and a mono- to hexahydric alcohol having a total carbon atom numbers of from 11 to 70 with the carbon atoms of the fatty acid; fatty acids having from 8 to 40 carbon atoms or amides or alkyl amides thereof, and aliphatic alcohols.

Specific examples of these organic lubricants include butyl caprylate, octyl caprylate, ethyl laurate, butyl laurate, octyl laurate, ethyl myristate, butyl myristate, octyl myristate, 2-ethylhexyl myristate, ethyl palmirate, butyl palmitate, octyl palmitate, 2-ethylhexyl palmirate, ethyl stearate, butyl stearate, isobutyl stearate, octyl stearate, 2-ethylhexyl stearate, amyl stearate, isoamyl stearate, 2-ethylpentyl stearate, 2-hexyldecyl stearate, isotridecyl stearate, stearamide, stearic acid alkylamides, butoxyethyl stearate, anhydrosorbitan monostearate, anhydrosorbitan distearate, anhydrosorbitan tristearate, anhydrosorbitan tetrastearate, oleyl oleate, oleyl alcohol, lauryl alcohol, montan wax, and carnauba wax. These compounds may be used either singly or in a combination thereof.

So-called lubricating oil additives may also be used as lubricants either singly or in a combination. The lubricating oil additives include antioxidants known as anticorrosive agents, such as alkylphenols, benzotriazine, tetraazaindene, sulfamide, guanidine, nucleic acid, pyridine, amine, hydroquinone, and metal chelating agents (e.g., EDTA); anti-corrosive agents, such as naphthenic acid, alkenylsuccinic acid, phosphoric acid, and dilauryl phosphate; oily agents such as rape seed oil and lauryl alcohol; extreme pressure additives, such as dibenzyl sulfide, tricresyl phosphate, and tributyl phosphite; detergent-dispersants, viscosity index improvers, pour point depressants, and defoaming agents.

The lubricant is usually added in the magnetic layer or backing layer in an amount of from 0.01 to 30 parts by weight per 100 parts by weight of the binder. For the details of the lubricants and usage thereof, reference can be made to JP-B-43-23889, JP-B-48-24041, JP-B-48-18482, JP-B-44-18221, JP-B-47-28043, JP-B-57-56132, JP-A-59-8136, JP-A-59-8139, JP-A-61-85621, U.S. Pat. Nos. 3,423,233, 3,470,021, 3,492,235, 3,497,411, 3,523,086, 3,625,760, 3,630,772, 3,634,253, 3,642,539, 3,687,725, 4,135,031, 4,497,864, and 4,552,794, *IBM Technical Disclosure Bulletin*, Vol. 9, No. 7, p. 779 (December, 1966), *ELECTRONIK*, No. 12, p. 380 (1961), and *KAGAKU BINRAN OYO-HEN*, pp. 954–967, Maruzen (1980).

Dispersants or dispersing aids which can be used in the present invention include fatty acids having from 2 to 40 carbon atoms represented by formula $R_1COOH$ (wherein $R_1$ represents an alkyl group having from 1 to 39 carbon atoms, a phenyl group, or an aralkyl group having up to 39 carbon atoms), such as caprylic acid, capric acid, lauric acid, myristic acid, palmitic acid, stearic acid, oleic acid, elaidic acid, linolic acid, linoleic acid, stearolic acid, behenic acid, maleic acid, and phthalic acid; metallic soaps obtained from these fatty acids and an alkali metal (e.g., Li, Na, K), $NH_4^+$, an alkaline earth metal (e.g., Mg, Ca, Ba), Cu, Pb, etc., such as copper oleate; fatty acid amides, and lecithin (soybean lecithin). In addition, higher alcohols having from 4 to 40 carbon atoms (e.g., butanol, octyl alcohol, myristyl alcohol, stearyl alcohol) and sulfuric esters thereof; sulfonic acid, phenylsulfonic acid, alkylsulfonic acids, sulfonic esters, phosphoric monoesters, phosphoric diesters, phosphoric triesters, alkylphosphonic acids, phenylphosphonic acids, and amine compounds are also employable. Further, polyethylene glycol, polyethylene oxide, sulfosuccinic acid, sulfosuccinic acid metal salts, and sulfosuccinic esters may also be employed. These dispersants or dispersing aids are usually used singly in an amount of from 0.005 to 20 parts by weight per 100 parts by weight of the binder.

The dispersants or dispersing aids may be adhered onto the surface of a ferromagnetic powder or a non-magnetic powder before dispersing or may be added in the course of dispersing. Examples of suitable dispersants or dispersing aids and usage thereof are described in JP-B-39-28369, JP-B-44-17945, JP-B-44-18221, JP-B-48-7441, JP-B-48-15001, JP-B-48-15002, JP-B-48-16363, JP-B-49-39402, and U.S. Pat. Nos. 3,387,993 and 3,470,021.

Antifungal agents which can be used in the present invention include 2-(4-thiazolyl)-benzimidazole, N-(fluorodichloromethylthio)-phthalimide, 10,10'-oxybisphenoxarsine, 2,4,5,6-tetrachloroisophthalonitrile, p-tolyldiiodomethylsulfone, triiodoallyl alcohol, dihydroaceto acid, mercury phenyloleate, bis(tributyltin) oxide, and salicylanilide. These antifungal agents are described, e.g., in *BISEIBUTSU KOGAI TO BOSHI GIJUTSU*, Kogaku Tosho (1972) and *KAGAKU TO KOGYO*, No. 32, p. 904 (1979). The antifungal agent is usually used in an amount of from 0.005 to 20 parts by weight per 100 parts by weight of a binder resin.

Antistatic agents which can be used in the present invention, other than carbon black, include: conductive powders, such as graphite, modified graphite, carbon black-grafted polymers, tin oxide-antimony oxide, tin oxide, and titanium oxide-tin oxide-antimony oxide; natural surface active agents, such as saponin; nonionic surface active agents, such as alkylene oxides, glycerin derivatives, glycidol derivatives, polyhydric alcohols, polyhydric alcohol esters, and alkylphenol ethylene oxide adducts; cationic surface active agents, such as higher alkylamines, cyclic amines, hydantoin derivatives, amideamines, ester amides, quaternary ammonium salts, pyridine and other heterocyclic compounds, phosphonium salts, and sulfonium salts; anionic surface active agents containing an acid radical derived from, e.g., carboxylic acids, sulfonic acid, phosphonic acid, phosphoric acid, sulfuric acid esters, phosphoric acid esters, and phosphonic acid esters; and amphoteric surface active agents, such as amino acids, aminosulfonic acids, amino alcohol sulfuric or phosphoric acid esters, and alkyl betaines. These surface active agents may be used either singly or in a combination thereof. Some of the possible surface active agents serving as antistatic agents are described in JP-A-60-28025, U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174, and 3,545,974, West German Patent Publication (OLS) 1942665, British Patents 1077317 and 1198450; Oda Ryohei, et al., *KAIMEN KASSEIZAI NO GOSEI TO SONO OYO*, Kozue Shoten (1972); A. W. Bailey, *Surface Active Agents*, Interscience Publication Corp. (1985); T. P. Sisley, *Encyclopedia of Surface Active Agents*, Vol. 2, Chemical Publish Co. (1964); *KAIMEN KASSEIZAI BINRAN*, Sangyo Tosho K. K. (1966); and Marushige Hideo, *TAIDEN BOSHIZAI*, Sachi Shobo (1968). The surface active agents are usually used in an amount of from 0.01 to 10 parts by weight per 100 parts by weight of a ferromagnetic powder in the magnetic layer, or from 0.01 to 30 parts by weight per 100 parts by weight of a binder in the backing layer. While the above-described surface active agents are chiefly used for the purpose of preventing static charge, they may also be used for other purposes, such as aiding dispersion, improving magnetic characteristics, improving lubricating properties, aiding coating, accelerating hardening, or accelerating dispersion.

Organic solvents which can be used in the preparation (e.g., dispersing and kneading) of a coating composition for a magnetic layer, a backing layer, or any other layer, or which can be used during coating include ketones, such as acetone, methyl ethyl ketone, methyl isobutyl ketone, cyclohexanone, tetrahydrofuran, and isophorone; alcohols, such as methanol, ethanol, propanol, butanol, isobutyl alcohol, isopropyl alcohol, and methylcyclohexanol; esters, such as methyl acetate, ethyl acetate, butyl acetate, isobutyl acetate, isopropyl acetate, ethyl lactate, and glycol acetate monoethyl ether; ethers, such as diethyl ether, tetrahydrofuran, glycol dimethyl ether, glycol monoethyl ether, and dioxane; aromatic hydrocarbons, such as benzene, toluene, xylene, cresol, chlorobenzene, and styrene; chlorinated hydrocarbons, such as methylene chloride, ethylene chloride, carbon tetrachloride, chloroform, ethylene chlorohydrin, monochlorobenzene, and dichlorobenzene; N,N-dimethylformamide, hexane, and so on. These organic solvents are usually used in a combination of two or more at an arbitrary mixing ratio. The organic solvents may contain up to 1% by weight of impurities including polymerization products of the solvent, water, and raw materials.

The solvent is usually used in an amount of from 100 to 20,000 parts by weight per 100 parts by weight of the total solids content of any coating composition for a magnetic layer, a backing layer, or an undercoating layer. A preferred solids content of a magnetic layer coating composition or a backing layer coating composition is from 10 to 40% by weight or from 5 to 20% by weight, respectively. An aqueous solvent (e.g., water, alcohols, acetone) may be used in place of the organic solvent.

A magnetic layer coating composition prepared from an arbitrary combination of the above-mentioned components is coated on a support, dried, and subjected to orientation to form a magnetic layer. The support includes tapes having a thickness usually of from about 2.5 to 100 μm, preferably of from 3 to 70 μm, cards having a thickness of from about 0.03 to 10 mm, and cylinders. Materials of the support include plastics, such as polyesters, e.g., polyethylene terephthalate and polyethylene naphthalate, polyolefins, e.g., polypropylene, cellulose derivatives, e.g., cellulose triacetate and cellulose diacetate, vinyl resins, e.g., polyvinyl chloride, polycarbonate, polyimide, polyamide, and polysulfone; and metals, e.g., aluminum and copper, glass, and ceramics. If desired, the support may be previously subjected to surface treatments, such as a corona discharge treatment, a plasma treatment, an undercoating treatment, a heat treatment, a dust removing treatment, a metal deposition treatment, and an alkali treatment. For the details of the support, refer to West German Patent 3338854A, JP-A-59-116926, JP-A-61-129731, U.S. Pat. No. 4,388,368, and Yukio Miishi, *SEN-I TO KOGYO*, Vol. 31, pp. 50–55 (1975). In the production of video tapes, the Young's modulus (F5 value: the load at the 5% elongation) of the support is selected from the range of 2 to 30 kg/mm$^2$ in both the machine (i.e., longer) and transverse (i.e., width) directions.

In the preparation of coating compositions, the method of dispersing and kneading is not restricted. The order or stage of addition of components (inclusive of resins, powders, lubricants, solvents, etc.) and the dispersing temperature (usually ranging from 0° to 80° C.) are selected appropriately. Dispersing and kneading can be carried out by means of a commonly employed dispersion mixer, such as a two-roll mill, a three-roll mill, a ball mill, a pebble mill, a trommel, a sand grinder, a Szegvari, an attritor, a high-speed impeller, a dispersing machine, a high-speed stone mill, a high-speed impact mill, a disper, a kneader, a high-speed mixer, a ribbon blender, a cokneader, an intensive mixer, a tumbler, a blender, a disperser, a homogenizer, a single-screw extruder, a twin-screw extruder, and an ultrasonic disperser. Kneading and dispersing are generally conducted continuously by an apparatus equipped with a plurality of these dispersion mixers. The details with respect to the kneading and dispersing step are described, e.g., in T. C. Patton, *Paint Flow and Pigment Dispersion*, John Wiley & Sons (1964) and Shin-ichi Tanaka, *KOGYO ZAIRYO*, Vol. 25, p. 37 (1977), and references cited in these publications. The kneading and dispersion efficiency may be increased with the aid of spherical or other-shaped auxiliaries, e.g., steel balls, steel beads, ceramic beads, glass beads, or organic polymer beads having a sphere-equivalent diameter of from 0.05 mm to 10 cm. The details are referred to U.S. Pat. Nos. 2,581,414 and 2,855,156. The magnetic layer coating composition and backing layer coating composition in the present invention can be prepared in accordance with the known techniques described in the above-cited publications.

Before coating, the coating composition is adjusted to a viscosity of from 1 to 20,000 cSt (25° C.). Coating can be carried out by means of air doctor coating, blade coating, air knife coating, squeeze coating, dip coating, reverse-roll coating, transfer-roll coating, gravure coating, kiss coating, cast coating, spray coating, rod coating, forward roll coating, curtain coating, extrusion coating, bar coating, or any other coating technique. The details for these coating techniques are described in *Coating KOGYO*, pp. 253–277, Asakura Shoten (1971). The order of coating the magnetic layer coating composition and the backing layer coating composition is arbitrary. In order to improve adhesion between a support and a magnetic layer or a backing layer, an undercoating layer may be previously coated on the support, or the support may be subjected beforehand to a corona discharge treatment. A multi-layered magnetic layer or backing layer can be formed by simultaneous coating or successive coating. For details of the formation of multiple layers, reference can be made to JP-A-57-123532, JP-B-62-37451, JP-A-59-142741, and JP-A-59-165239.

The magnetic layer coating composition is coated on a support to a wet thickness of from about 1 to 200 μm. Immediately after being coated, the magnetic composition is subjected to orientation in a desired direction (i.e., a vertical direction, a longer direction, a width direction, at random, or an oblique direction) in a magnetic field of about 500 to 5,000 gauss. If necessary, the orientation is performed while drying the ferromagnetic powder in multiple stages each at a controlled temperature within a range of from 20° C. to 130° C. Thereafter, the magnetic layer is dried to a dry thickness of from 0.1 to 30 μm. During these operations, the support is usually conveyed at a speed of from 10 m/min to 900 m/min. The drying is performed in a plurality of drying zones at a controlled temperature within the range of from 20° to 130° C. until the resulting coating film has a residual solvent content of from 0.1 to 40 mg/m$^2$.

If desired, the thus-formed magnetic layer or backing layer is subjected to a surface smoothing finish so as to have a centerline average roughness of from 0.001 to 0.3 μm ((cut-off: 0.08 mm) according to JIS B 0601). The coated material is cut or trimmed to a desired shape or size to obtain a magnetic recording medium of the present invention.

It is desirable that the above-mentioned steps of producing the magnetic recording medium consisting of preliminary treatment or surface treatment of powders, kneading-mixing, coating-orientation-drying, smoothing treatment, heating treatment, irradiation (EB) treatment, surface polishing treatment, cutting, and winding be conducted in a continuous manner as described, for example, in JP-B-40-23625, JP-B-39-28368, JP-B-47-38802, British Patent 1191424, JP-B-48-11336, JP-A-49-53631, JP-A-50-112005, JP-A-51-77303, JP-B-52-17404, JP-A-60-70532, JP-A-2-265672, and U.S. Pat. Nos. 3,473,960, 4,728,569, and 4,746,542. In particular, the method disclosed in JP-B-41-13181 is accepted as a basic and important technique in the art.

After cutting to size, a magnetic recording medium (tape) is wound around a desired plastic or metallic reel. Immediately before the winding or in an earlier step, the recording medium is preferably subjected to vanishing and/or cleaning. Vanishing is a smoothing step comprising scraping protrusions on the surfaces of the magnetic recording medium inclusive of the magnetic layer, the backing layer, the edges, and the base surface with a hard tool. Any hard tool capable of scraping protrusions may be used, but those having a Mohs' hardness of 8 or higher are preferred. Examples of such a hard tool include a sapphire blade, a razor blade, a super-hard blade, a diamond blade, and a ceramic blade. The shape of the tool is not limited to a blade, and tools having an angular shape, a round shape or a wheel shape (a rotating cylinder having a hard material on the surface thereof) may also be used. Cleaning is a step comprising wiping the surface of the recording medium (the magnetic layer, the backing layer, the edges, and the base surface on the back side) with a cloth to remove contaminants or excess lubricant. Examples of the wiping cloth include various "Vilene" produced by Japan Vilene Co., Ltd.; "Toraysee" and "Ecsaine" produced by Toray Industries, Inc.; "Kimwipe" produced by Jujo Kimberly Co., Ltd.; various polishing tapes (lapping tapes) produced by Fuji Photo Film Co., Ltd.; nylon nonwoven fabric, polyester nonwoven fabric, rayon nonwoven fabric, acrylonitrile nonwoven fabric, mixed nonwoven fabric; and tissue paper. These and other examples of the wiping cloth are described in JP-B-46-39309, JP-B-58-46768, JP-A-56-90429, JP-B-58-46767, JP-A-63-259830, and JP-A-1-201824.

The present invention is now illustrated in greater detail with reference to Examples, but it should be understood that the present invention is not construed as being limited thereto. All the percents and parts are by weight.

EXAMPLES 1 TO 6 AND COMPARATIVE EXAMPLES 1 TO 6

Composition (1) shown below was kneaded in an open kneader and then dispersed in a sand mill together with composition (2) shown below. Immediately before coating, composition (3) shown below was added to the dispersion to prepare a coating composition for a magnetic layer.

Magnetic Layer Coating Composition

Composition (1):

| | |
|---|---|
| Ferromagnetic alloy powder (Fe powder; Al content: 4%; specific surface area ($S_{BET}$): 55 m$^2$/g) | 100 parts |
| Phosphoric acid ester (nonylphenyl polyethylene glycol phosphate) | 1 part |
| Lecithin | 0.3 part |
| Vinyl chloride-vinyl acetate copolymer resin ("MR 110" produced by Nippon Zeon Co., Ltd.) | 10 parts |
| Urethane resin ("UR 8600" produced by Toyo Spinning Co., Ltd.) | 2 parts |
| Cyclohexanone | 30 parts |
| Methyl ethyl ketone | 20 parts |

Composition (2):

| | |
|---|---|
| Dispersion consisting of:- | |
| Carbon black (see the note below) | X part(s) |
| Urethane resin "UR 8600" (Toyo Spinning) | 2 parts |
| Methyl ethyl ketone | 10 parts |
| Dispersion consisting of:- | |
| Abrasive ("HIT 55" produced by Sumitomo Chemical Co., Ltd.) | 10 parts |
| Urethane resin "UR 8600" (Toyo Spinning) | 2 parts |
| Methyl ethyl ketone | 10 parts |

-continued

| | |
|---|---|
| Cyclohexanone | 150 parts |

Note:
First carbon black (C1) and second carbon black (C2) selected from the kinds shown in Table 1 below were used in the respective amount shown in Table 2 below. In Comparative Example 1, no carbon black was used. In Comparative Examples 2 to 4, only C2 falling within the scope of the present invention was used. Carbon black III used as C2 in Comparative Example 5 has a DBP absorption in the middle of C1 and C2 according to the present invention. Carbon Black IV used as C2 in Comparative Example 6 has a greater DBP absorption than that of C2 according to the present invention.

Composition (3):

| | |
|---|---|
| Polyisocyanate ("Coronate 3040" produced by Nippon Polyurethane Co., Ltd.) | 4 parts |
| Methyl ethyl ketone | 50 parts |
| Toluene | 10 parts |
| 2-Ethylhexyl stearate | 0.5 part |
| Stearic acid dibutylamide | 0.5 part |
| Palmitic acid | 0.3 part |
| Butoxyethyl stearate | 0.5 part |
| Oleic acid | 0.3 part |

The resulting magnetic coating composition was coated on a 7.0 μm thick polyethylene naphthalate support (MD Young's modulus: 800 kg/mm²; TD Young's modulus: 750 kg/mm²) to obtain the magnetic layer having a dry thickness of 2.5 μm.

The coated composition was subjected to magnetic orientation while wet and then, after being dried, to calendering.

A coating composition for a backing layer was prepared by adding composition (5) shown below to composition (4) shown below immediately before coating. The resulting coating composition was coated on the opposite side of the support to obtain the backing layer having a dry thickness of 0.6 μm. The coated film was slit to a width of ½ in. to obtain a video tape.

Backing Layer Coating Composition

Composition (4):

| | |
|---|---|
| Carbon black ("BR 800" produced by Cabot Corp.) | 100 parts |
| Carbon black ("MTCI" produced by Cancarb Company) | 1 part |
| α-Alumina ("HIT 55" produced by Sumitomo Chemical Co., Ltd.) | 0.1 part |
| Barium sulfate ("BF 1" produced by Sakai Chemical Industry Co., Ltd.) | 0.5 part |
| 2-Ethylhexyl stearate | 0.5 part |
| Copper oleate | 0.1 part |
| Vinyl chloride-vinyl acetate copolymer resin "MR 110" (Nippon Zeon) | 50 parts |
| Urethane resin "UR 8600" (Toyo Spinning) | 40 parts |
| Cyclohexanone | 250 parts |
| Methyl ethyl ketone | 150 parts |

Composition (5):

| | |
|---|---|
| Polyisocyanate "Coronate 3040" (Nippon Polyurethane) | 30 parts |
| Cyclohexanone | 150 parts |
| Methyl ethyl ketone | 250 parts |
| Toluene | 100 parts |
| Silicone oil ("KF 69" produced by | 0.1 part |

-continued

| | |
|---|---|
| Shin-Etsu Chemical Industry Co., Ltd.) | |

Each of the resulting video tape samples was evaluated according to the following test methods. The results obtained are shown in Table 2.

1) Surface Roughness:

Centerline average surface roughness Ra ((cut-off value: 0.08 mm) according to JIS B 0601) was measured with a contact feeler type roughness meter ("Surfcomb 800A" produced by Tokyo Seimitsu Co., Ltd.).

2) Gloss:

The gloss of the magnetic layer was measured in accordance with JIS Z-8741 (angle of incidence: 45°). The result was expressed relatively taking the specular gloss of a black glass plate having a refractive index of 1.567 as 100%.

3) Still Life:

A video tape recorder "NV-8300" manufactured by Matsushita Electric Industrial Co., Ltd. was used. Recording and reproduction was conducted at 23° C. and 10% RH (relative humidity). The time required for a still mode image to disappear by ⅓ of the monitor screen was measured.

4) Reproduction Output (VS):

A video tape recorder "M2" manufactured by Matsushita Electric Industrial Co., Ltd. fitted with a ferrite head was used. The reproduction output (VS) of a recording wavelength of 0.6 μm was measured at a controlled running speed. The result was expressed relatively taking the VS of Comparative Example 1 as 0 dB.

5) Coefficient of Dynamic Friction:

The sample tape was turned around a stainless steel pole (diameter: 3.8 mm) at an angle of 180° C. under a tension (T1) of 50%. The tension (T2) required for running the tape at a speed of 3.3 cm/s at 20° C. and 65% RH was measured. From the measurement value T2, a coefficient of dynamic friction (μ) was obtained from equation:

$$\mu = (1/\pi) \cdot \ln(T2/T1)$$

6) C/N Ratio:

Video signals of 7 MHz were recorded and reproduced on a vide tape recorder "M2" (Matsushita Electric Industrial). The C/N ratio at 1 MHz was measured by means of a spectroanalyzer.

7) Output Reduction:

Recording was conducted on a video tape recorder "M2" (Matsushita Electric Industrial). After 5-minutes long reproduction and subsequent rewinding were repeated 1000 times, the reproduction output was measured, and a difference (dB) from that of the first pass was obtained.

TABLE 1

| Kinds of Carbon Black | Average Size (mμ) | DBP Absorption (ml/100 g) |
|---|---|---|
| I: MITSUBISHI #950B | 16 | 74 |
| II: MITSUBISHI #3250B | 30 | 160 |
| III: CABOT BP 905 | 17 | 125 |
| IV: MITSUBISHI #3950B | 15 | 360 |

TABLE 2

| Example No. | Carbon Black C1 | Amount of C1 (part) | C2 | Amount of C2 (part) | Gloss (%) | Ra (nm) | μ Value | C/N Ratio (dB) | VS (dB) | Still Life (min) | Output Reduction (dB) |
|---|---|---|---|---|---|---|---|---|---|---|---|
| Example 1 | I | 0.5 | II | 0.5 | 267 | 3.9 | 0.24 | −1.0 | −1.5 | 60 | −0.6 |
| Example 2 | I | 1.0 | II | 0.5 | 268 | 3.8 | 0.24 | −1.1 | −1.0 | 90 or more | −0.5 |
| Example 3 | I | 2.0 | II | 0.5 | 268 | 3.7 | 0.23 | −1.2 | −1.0 | 90 or more | −0.5 |
| Example 4 | I | 0.5 | II | 1.0 | 266 | 4.0 | 0.23 | −1.2 | −1.7 | 90 or more | −0.5 |
| Example 5 | I | 1.0 | II | 1.0 | 267 | 3.8 | 0.22 | −1.2 | −1.5 | 90 or more | −0.4 |
| Example 6 | I | 2.0 | II | 1.0 | 267 | 3.8 | 0.22 | −1.2 | −1.3 | 90 or more | −0.4 |
| Comparative Example 1 | None | — | None | — | 270 | 3.5 | 0.40 | 0 | 0 | 13 | −2.5 |
| Comparative Example 2 | None | — | II | 0.5 | 267 | 4.0 | 0.26 | −1.5 | −2.2 | 10 | −2.2 |
| Comparative Example 3 | None | — | II | 1.0 | 266 | 4.3 | 0.25 | −1.8 | −2.5 | 42 | −2.3 |
| Comparative Example 4 | None | — | II | 2.0 | 262 | 4.5 | 0.26 | −2.0 | −2.8 | 90 or more | −2.5 |
| Comparative Example 5 | None | — | III | 1.0 | 267 | 4.1 | 0.30 | −1.6 | −2.4 | 30 | −2.2 |
| Comparative Example 6 | I | 0.5 | IV | 0.5 | 260 | 4.7 | 0.23 | −2.5 | −3.5 | 70 | −0.6 |

As is apparent from the results in Table 2, the video tapes of Examples 1 to 6 which contained two carbon black kinds whose DBP absorption is within the respective specific range proved satisfactory in all the characteristics evaluated. To the contrary, each of the comparative samples was poor in one or more of these characteristics.

As demonstrated above, the magnetic recording medium according to the present invention exhibits marked improvement in output and running stability.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a non-magnetic support having thereon a magnetic layer comprising a ferromagnetic powder and a binder resin, wherein the magnetic layer contains at least two kinds of carbon black each having separate oil absorptions, the first carbon black having an average particle size of from 5 to 35 mμ and a DBP absorption of from 50 to 100 ml/100 g, and the second carbon black having an average particle size of from 5 to 35 mμ and a DBP absorption of from 150 to 190 ml/100 g.

2. The magnetic recording medium as claimed in claim 1, wherein said at least two kinds of carbon black are present in a total amount of from 0.5 to 5 parts by weight per 100 parts by weight of the ferromagnetic powder, and the ratio of the first carbon black to the second carbon black is from 95/5 to 40/60 by weight.

3. The magnetic recording medium as claimed in claim 1, wherein said magnetic layer has a center average surface roughness (Ra) of not more than 5.0 nm, and said ferromagnetic powder is a ferromagnetic metal powder.

4. The magnetic recording medium as claimed in claim 1, wherein the ratio of the first carbon black to the second carbon black is from 90/10 to 50/50.

* * * * *